(12) United States Patent
Wilson, Jr. et al.

(10) Patent No.: US 8,556,576 B2
(45) Date of Patent: Oct. 15, 2013

(54) COOLED IBR FOR A MICRO-TURBINE

(75) Inventors: Jack W Wilson, Jr., Palm Beach Gardens, FL (US); John E Ryznic, Palm Beach Gardens, FL (US); James P Downs, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 665 days.

(21) Appl. No.: 12/894,476

(22) Filed: Sep. 30, 2010

(65) Prior Publication Data
US 2012/0082563 A1  Apr. 5, 2012

(51) Int. Cl.
*F01D 5/18*  (2006.01)
(52) U.S. Cl.
USPC .............. 415/115; 415/199.5; 416/97 R

(58) Field of Classification Search
USPC ............ 415/115, 191, 199.5; 416/96 R, 97 R
See application file for complete search history.

(56) References Cited

U.S. PATENT DOCUMENTS 5,876,182 A * 3/1999 Schulte ...................... 415/115
7,431,564 B2 * 10/2008 Newman ................... 416/193 A

* cited by examiner

*Primary Examiner* — Ninh H Nguyen
(74) *Attorney, Agent, or Firm* — John Ryznic

(57) ABSTRACT

A micro gas turbine engine in which the turbine rotor blades are formed as an integral bladed rotor with cooling air passages formed within the blades and the rotor disk by an EDM process. an adjacent stator vane includes an air riding seal with an air cushion supplied through the vanes to provide cooling, and where the air cushion is then passed into the turbine blades and rotor disk to provide cooling for the turbine blades. With cooling of the turbine blades, higher turbine inlet temperatures for micro gas turbine engines can be produced.

11 Claims, 5 Drawing Sheets

COOLED IBR FOR A MICRO-TURBINE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a micro gas turbine engine, and more specifically to an air cooled IBR for a micro gas turbine engine.

2. Description of the Related Art Including Information Disclosed Under 37 CFR 1.97 and 1.98

Very small gas turbine engines (also referred to as micro gas turbine engines) are of the size of around a few hundred pounds thrust. Larger gas turbine engines of the size to power an aircraft, such as a commercial airliner or a military jet, have steadily increased the efficiency of the engine through the years since the gas turbine engine was first commercialized. The steady increase in efficiency is mainly due to improvements in cooling of the turbine airfoils such that a higher turbine inlet temperature can be used. However, for the micro turbines, the efficiency of the engine has not changed much since the earliest ones were produced.

The main reason why the efficiency of micro gas turbine engines has not changed much is due to the turbine vanes and blades not being cooled. These engines are so small that the size of the rotor blades or stator vanes is too small to form internal cooling air passages. In the larger engines, the cooled airfoils are produced using an investment casting process also known as the lost wax process in which a ceramic core representing the cooling passages is cast into the metal airfoil and then leached away to leave the internal cooling passages within the metal airfoil.

Larger engines have individual blades secured to a rotor disk through a fir tree configuration. A slight gap exists between the blade root and the slot in the rotor disk in which compressed air can pass from the higher pressure forward side to the lower pressure aft side of the rotor disk. Cover plates are used to cover over these gaps and limit this air leakage and to protect the rotor disk sides from the high thermal temperatures from exposure to the hot gas stream.

For the micro sized gas turbine engines, using individual rotor blades attached to the rotor disk is not feasible because of the small size. The blade root to rotor disk slot gaps would be proportionally larger compared to the larger engines and therefore the leakage flow from one side of the rotor disk to the other would be very high in relation to the overall air flow. For this reason, the turbine rotor disks in the micro engines are formed as a single piece which is referred to as an IBR or integrally bladed rotor disk or blisk. The IBR is typically machined from a stock piece of material without any gaps between the blades and the disk and therefore no leakage flow is formed across the rotor disk. In the smallest of the micro turbine engines, the rotor blades are the size of a human fingernail. Thus, in order to improve the efficiency of a micro gas turbine engine, some sort of blade cooling is required.

BRIEF SUMMARY OF THE INVENTION

A micro gas turbine engine in which the turbine includes an IBR for the rotor blades and the stator vanes, and in which a airfoil cooling system is used to provide internal cooling for both the stator vanes and the rotor blades. An air riding seal is formed between the upstream stator vane assembly and the IBR for the turbine blades to channel cooling air through the vanes and then into the IBR and the rotor blades. The blade cooling air can be discharged through the blade tips to form a seal with a blade outer air seal or discharged into an adjacent purge cavity for purge air.

The air cooled IBR can be formed by casting the single piece IBR with solid airfoils in the blades, and then machining radial and axial holes in the airfoils using a wire or plunge EDM process. Any of the openings on the airfoils can be closed by a filler material or a blade tip that is secured into place.

In another embodiment, an IBR with a spar and shell construction can be produced in which the single piece rotor disk with spars is formed, and then individual shells can be secured over the spar to form the blades. The spar can have the cooling air passages formed therein to produce impingement cooling on the inner surface of the shell. The shell can include film cooling holes, blade tip cooling holes and even trailing edge exit holes to discharge the cooling air from the blade.

DETAILED DESCRIPTION OF THE INVENTION

Figure 1:
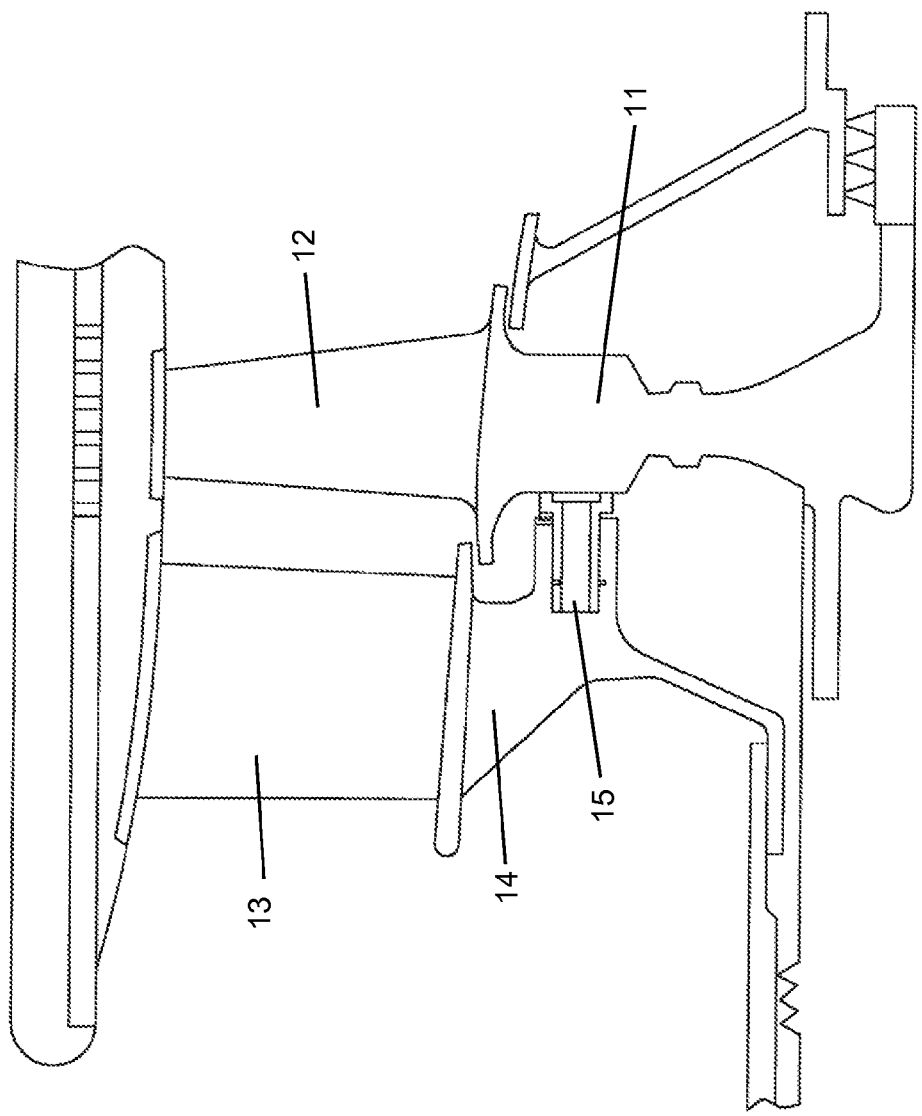
FIG. 1 shows a cross section view of a turbine of a micro gas turbine engine with the first stage stator vanes and the rotor blades of the present invention.

A micro-sized gas turbine engine of less than a few hundred pounds thrust in size in which the turbine includes an IBR for the rotor blades with an internal cooling system for the stator vanes and the rotor blades in the IBR. FIG. 1 shows a view of the first stage of the turbine with a rotor disk 11 having a rotor blade 12 extend there-from, and a stator vane 13 with an outer shroud and an inner shroud 14. An air riding seal 15 is formed between the stator vane assembly and the IBR to supply cooling air to the rotor blades 12. Details of the air riding seal can be found in co-pending U.S. patent application Ser. Nos. 12/371,955 filed on Feb. 17, 2009 and 12/781,327 filed on May 17, 2010, both of which are incorporated herein by reference. Cooling air is supplied from a pressurized source, such as the compressor, through a passage formed within one or more of the stator vanes to provide cooling for the vanes, and then through the air riding seal to form an air cushion to support the annular floating piston of the seal 15, and then into a passage formed within the rotor disk 11 and into the blades 12 to provide cooling for the blades.

Figure 2:
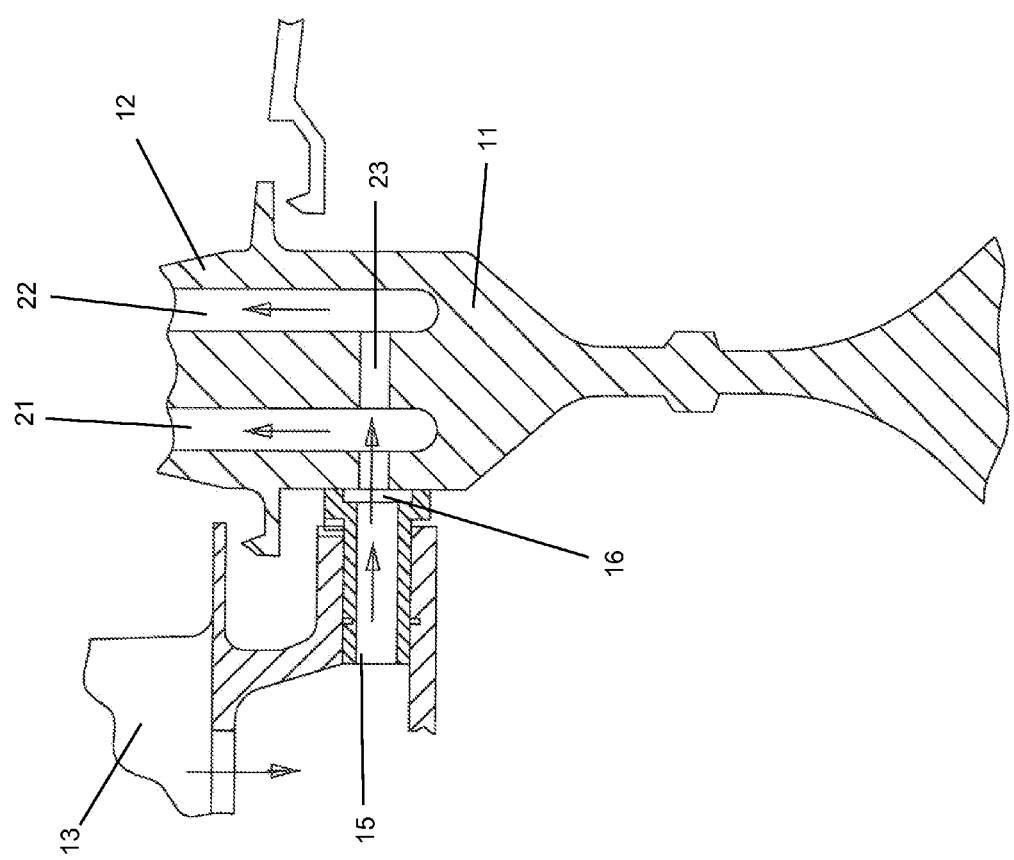
FIG. 2 shows a cross section view of the rotor blade and the air riding seal used to supply cooling air to the blade cooling air passages of the present invention.

FIG. 2 shows a detailed view of the blade cooling circuit and the air riding seal connection. The stator vane 13 supplies cooling air to the inner shroud of the vane on which the air riding seal 15 assembly is fixed. The air riding seal 15 includes an annular groove that opens toward the front or forward side of the IBR 11 and in which a floating annular piston is mounted for axial displacement along the engine axis. An air cushion chamber 16 is located on the side facing the IBR surface that forms an air cushion for the floating piston to ride when the compressed air from the vane is supplied. The blade of the IBR includes one or more radial passages 21 and 22 that form cooling air channels and extend from the tip end to a location within the blade root that will be connected by an axial passage 23 that opens into the air cushion chamber 16 of the air riding seal 15 to supply the cooling air. To reduce stress concentrations, the axial feed passage 23 has an elliptical cross sectional shape in which the major axis is around twice the length of the minor axis (width of hole twice that of the radial height). In the FIG. 2 embodiment, the cooling air channels open on the blade tip so that the cooling air is discharged out through the tip. FIG. 2 shows two radial cooling channels but if the blade is too small for two channels one radial channel can be used. The radial and axial cooling air channels are formed by a wire EDM (Electric Discharge Machining) process.

Figure 3:
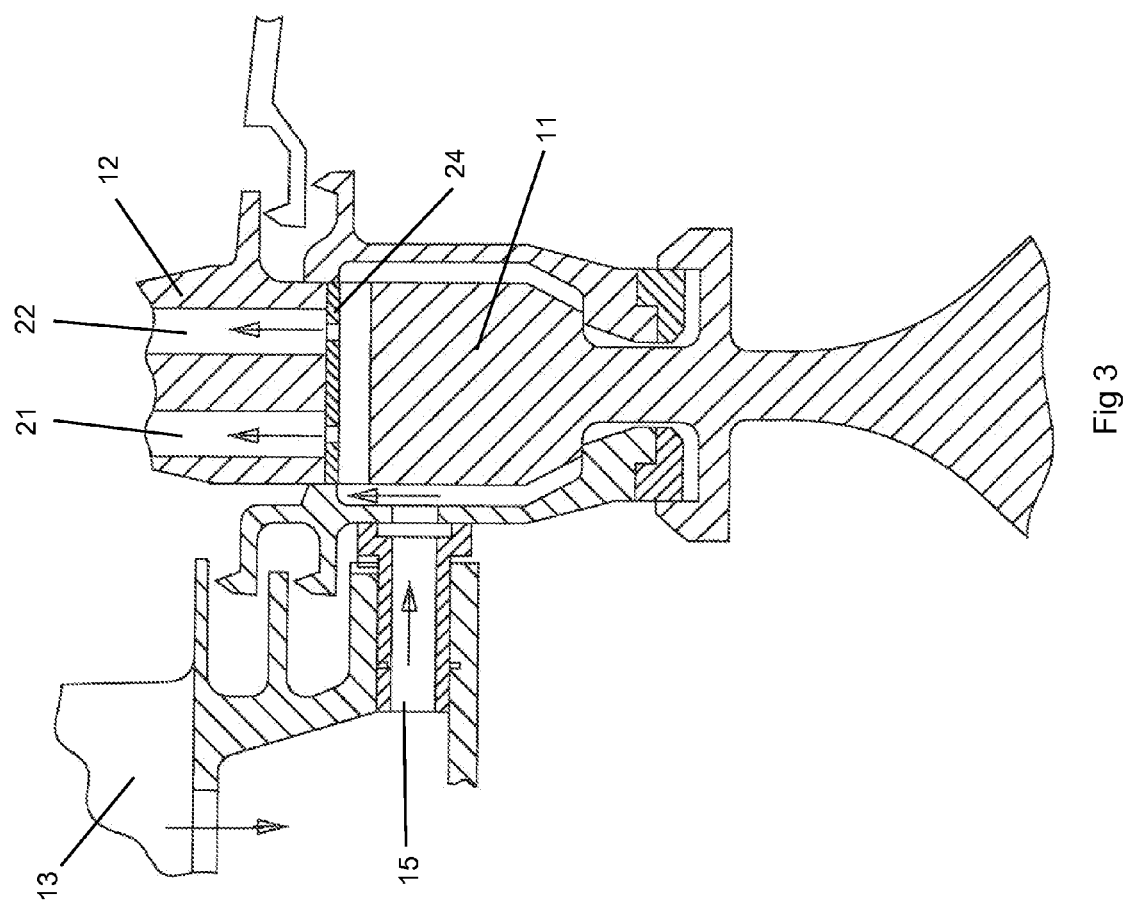
FIG. 3 shows a cross section view of a second embodiment of the rotor blade cooling circuit of the present invention.

FIG. 3 shows another embodiment of the cooled IBR for the micro gas turbine engine that is supplied with cooling air from a stator vane 13 and an air riding seal 15. In this embodiment, two radial cooling channels 21 and 22 are formed and an axial channel 23 in which a metering plate 24 with metering holes can be inserted and secured in place to meter the cooling air from the supply channel 23 to the two radial cooling air channels 21 and 22. In the FIG. 3 embodiment, two cover plates 35 and 36 are used on the forward side and the aft side of the rotor disk 11 that form cooling air channels leading into the axial channel in the IBR 11.

Figure 4:
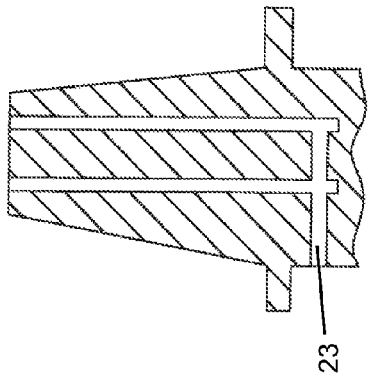
FIG. 4 shows a cross section view of a solid rotor blade used in the present invention.
Figure 5:
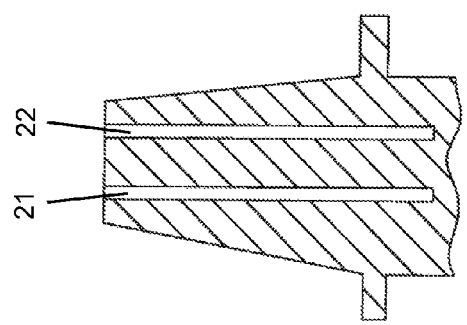
FIG. 5 shows a cross section view of the solid rotor blade of FIG. 4 with two radial cooling holes drilled therein.
Figure 6:
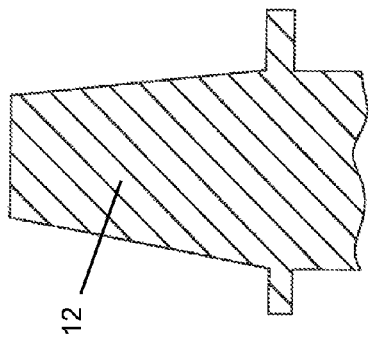
FIG. 6 shows a cross section view of the rotor blade of FIG. 5 with an axial cooling hole connecting the two radial cooling holes.

FIGS. 4-9 shows various views in the formation of the blade cooling channels from the solid blade of the IBR. FIG. 4 shows a solid blade 12 of the IBR without any cooling channels. FIG. 5 shows two radial cooling channels 21 and 22 extending from the blade tip and extending into the blade and the rotor disk far enough so that cooling air can be supplied and cooling of the hot sections of the blade and rotor disk can occur. FIG. 6 shows an axial channel 23 formed to connect both of the radial channels 21 and 22 to the forward side of the IBR in which the floating annular piston of the air riding seal 15 will be connected to for supplying the cooling air to the blade cooling channels. In FIG. 6, the two radial cooling channels open onto the blade tip to discharge the cooling air for cooling and sealing purposes.

Figure 7:
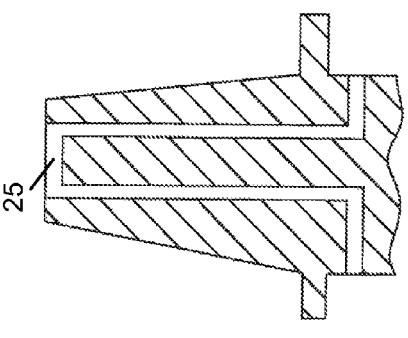
FIG. 7 shows a cross section view of a rotor blade with a closed cooling air circuit of the present invention.
Figure 8:
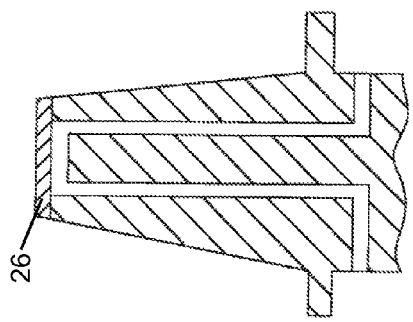
FIG. 8 shows a cross section view of the rotor blade of FIG. 7 with a tip cap secured to enclose the internal cooling air passages.
Figure 9:
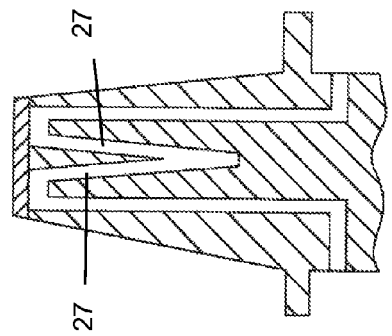
FIG. 9 shows a cross section view of a rotor blade with a serpentine flow arrangement of cooling holes.
Figure 10:
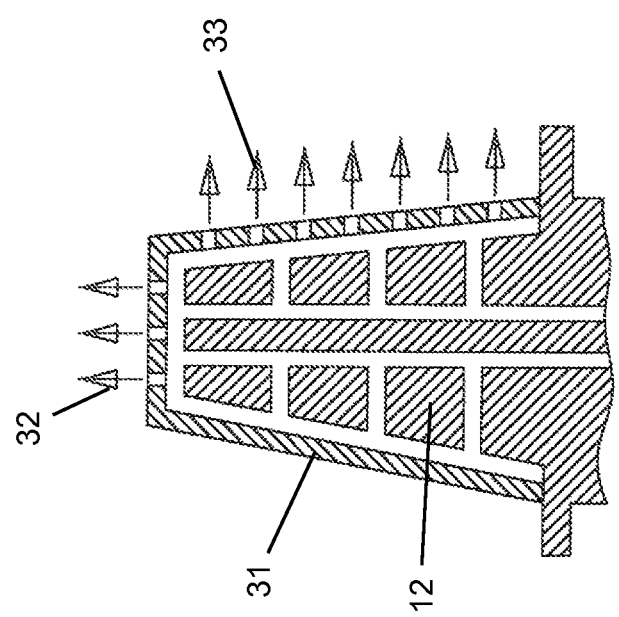
FIG. 10 shows a rotor blade for an IBR of the present invention formed from a spar and shell construction with a cooling air circuit.

FIG. 7 shows another embodiment of the IBR with a cooling path through the blade that does not discharge at the blade tip but loops back toward the root of the blade. In FIG. 7, a cross-over passage 25 is machined into the blade tip to connect the two radial channels 21 and 22 formed in FIG. 5. then, as seen in FIG. 8 a tip cap 26 is secured over the ends of the radial channels 21 and 22 and the cross-over channel 25 to enclose all three channels and form a closed loop for the cooling air path. A second axial channel is also formed to connect the aft radial channel 22 to the aft side of the rotor disk to discharge the cooling air as purge air for the aft rim cavity. FIG. 9 shows an additional embodiment in which two angled radial channels 27 are drilled with two cross-over channels connecting the radial channels 21 and 22 to the two angled radial FIG. 10 shows an embodiment of the IBR with a spar and shell construction in which the IBR includes spars 12 extending outward that form a support surface for an airfoil shaped shell 31 that is secured over the spar 12. The spar 12 can have cooling channels formed therein—such as by wire EDM—to form convection cooling or impingement cooling of the backside surface of the shell. The shell 31 can have film cooling holes in the leading edge, cooling holes in the blade tip 32 or exit discharge holes 33 along the trailing edge (or combinations of these cooling holes) to discharge the spent impingement cooling air discharged from the cooling channels formed in the spar 12. With the IBR having the spar and shell construction, the shell 31 can be made from an exotic high temperature resistant material (high melting temperature) such as a refractory metal while the IBR and the spars can be cast or machined from a lower melting temperature material such as a Nickel alloy. This would allow for even higher turbine inlet temperatures because of the refractory material of the shell.

We claim the following:

1. A process for making an air cooled integral bladed rotor for a micro gas turbine engine, the process comprising the steps of:
    forming an IBR with a rotor disk and a plurality of turbine rotor blades extending from the rotor disk;
    machining a first radial extending cooling air channel from the blade tip and extending into the blade root; and,
    machining a first axial extending cooling air channel into the blade root from a forward side of the rotor disk to connect to the first radial extending cooling air channel.

2. The process for making an air cooled integral bladed rotor of claim 1, and further comprising the steps of:
    machining a second radial extending cooling air channel from the blade tip and extending into the blade root; and,
    extending the first axial extending cooling air channel into the blade root to connect to the second radial extending cooling air channel.

3. The process for making an air cooled integral bladed rotor of claim 1, and further comprising the steps of:
    machining a second radial extending cooling air channel from the blade tip and extending into the blade root;
    machining a second axial extending cooling air channel into the blade root from an aft side of the rotor disk to connect to the second radial extending cooling air channel;
    machining a cross-over channel into the blade tip to connect the first radial extending cooling air channel to the second radial extending cooling air channel; and,
    securing a blade tip over the blade to enclose the two radial extending cooling air channels and the cross-over channel.

4. The process for making an air cooled integral bladed rotor of claim 1, and further comprising the steps of:
    machining the radial and axial extending cooling air channels using an EDM process.

5. The process for making an air cooled integral bladed rotor of claim 1, and further comprising the steps of:
    the axial channel has an elliptical cross sectional shape with a major axis of around two times the length of the minor axis.

6. The process for making an air cooled integral bladed rotor of claim 1, and further comprising the step of:

making the airfoils of the blades on the IBR with a spanwise length of less than one-half of an inch.

7. A micro gas turbine engine comprising:
a first stage turbine stator vane located downstream from a combustor;
a first stage turbine rotor blade located downstream from the first stage turbine stator vane;
the first stage turbine rotor blade being formed as an integral bladed rotor;
the first stage turbine stator vane having an inner shroud with an annular air riding seal extending from an aft side of the inner shroud, the air riding seal forming a floating air seal with a forward side of the integral bladed rotor;
the first stage turbine stator vane having a cooling air passage that supplies cooling air through the stator vane and to the annular air riding seal;
the integral bladed rotor having an axial extending cooling air channel opening on the forward side and a radial extending cooling air channel connected to the axial extending cooling air channel; and,
the axial extending cooling air channel being in fluid communication with the air riding seal to supply cooling air from the stator vane and into the radial extending cooling air channel to provide cooling for the turbine rotor blade.

8. The micro gas turbine engine of claim 7, and further comprising:
the radial extending cooling air channel opens onto the blade tip to discharge cooling air from the blade.

9. The micro gas turbine engine of claim 7, and further comprising:
a second radial extending cooling air channel opens onto the blade tip and is connected to the axial extending cooling air channel.

10. The micro gas turbine engine of claim 7, and further comprising:
the integral bladed rotor includes a second radial extending cooling air channel connected to the first radial extending cooling air channel and a second axial extending cooling air channel that opens onto an aft side of the rotor disk to discharge cooling air as purge air for a rim cavity.

11. The micro gas turbine engine of claim 7, and further comprising:
the airfoils of the blades of the integral bladed rotor are less than one-half an inch in spanwise length.

* * * * *